May 9, 1939.　　L. E. WRIGHT ET AL　　2,157,469
FAN FOR SEPARATORS
Filed March 11, 1936
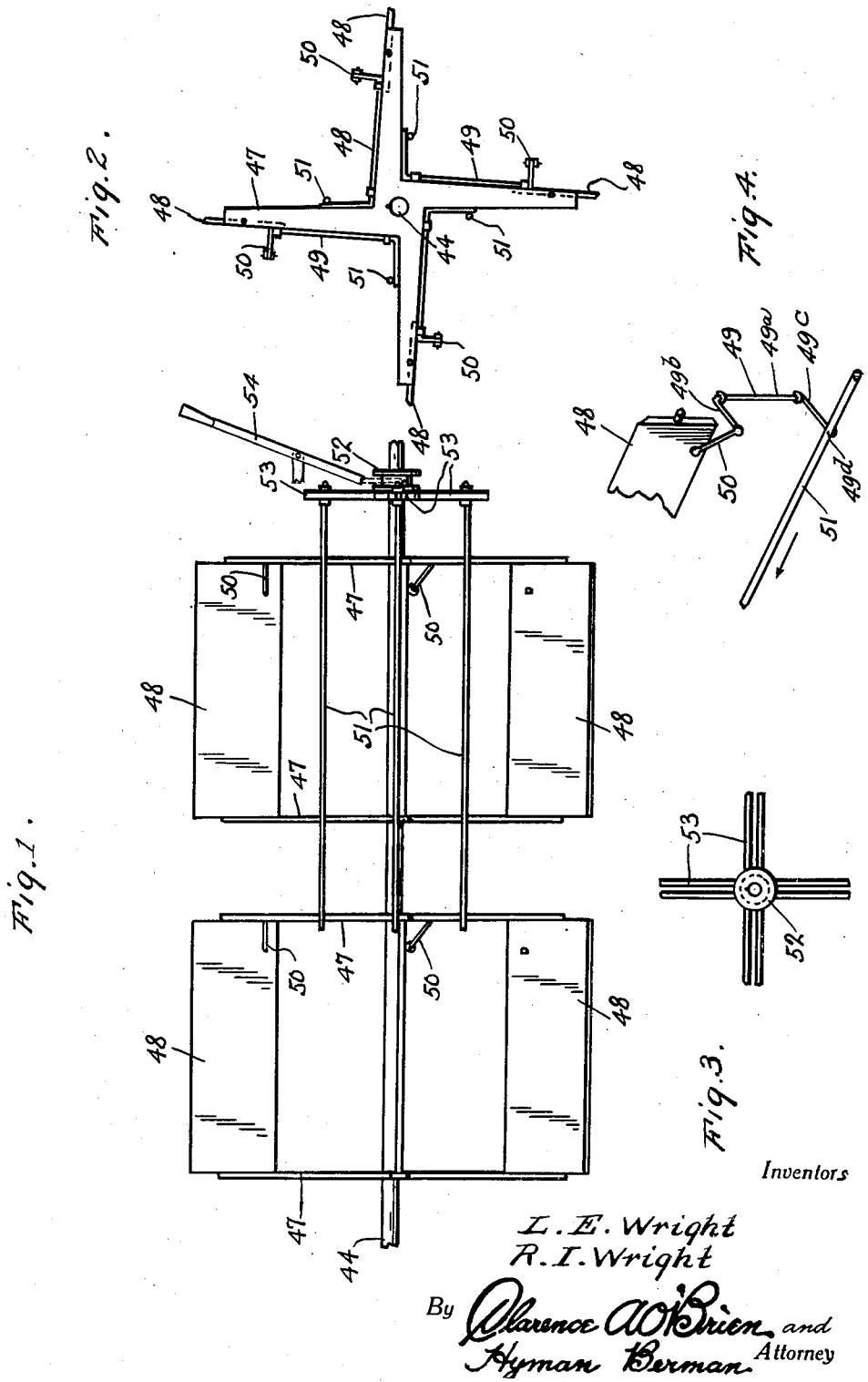
Inventors
*L. E. Wright*
*R. I. Wright*
By *Clarence A. O'Brien* and
*Hyman Berman*　Attorney Patented May 9, 1939

2,157,469

UNITED STATES PATENT OFFICE 2,157,469

FAN FOR SEPARATORS

Lloyd E. Wright and Robert I. Wright,
Albany, Oreg.

Application March 11, 1936, Serial No. 68,326

1 Claim. (Cl. 230—114)

The present invention relates to new and useful improvements in fan mechanism for use in an air separator for cleaning seed.

An important object of the invention is to provide a battery or series of blowers or fans, together with novel means for driving all of said fans by a single shaft and means for regulating said fans to control the velocity or force of the air or wind therefrom.

Other objects of the invention are to provide apparatus of the aforementioned character which will be comparatively simple in construction, strong, durable, highly efficient and reliable in use, compact, and which may be manufactured, installed and operated at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of the fans or blowers of our invention.

Figure 2 is a view in end elevation of one of the adjustable fans.

Figure 3 is a detail view in side elevation of the fan blade adjusting member.

Figure 4 is a fragmentary view in perspective, showing the means for adjusting the fan blades.

Referring now to the drawing in detail, it will be seen that the embodiment of the invention which has been illustrated comprises a shaft 44 which may be driven from any suitable source of power not shown. Fixed on the shaft 44 are spaced spiders 47 of the radial arm type. Journaled between the pairs of spiders 47 are feathering blades 48 said blades being grouped around said shaft in circumferentially spaced parallel relation thereto and adjustable about axes parallel with the axis of the shaft. Crank shafts 49 are journaled on the legs of the spiders 47 and said crank shafts are connected, at one end, to the blades 48 by links 50. The other ends of the crank shafts 49 are connected to operating rods 51 which extend parallel with the shaft 44 and are mounted as presently described for endwise movement. Each crank shaft 49 has the form of a substantially U-shaped lever including a base member 49a lying along and journaled on one leg of the related spider 47 and a pair of lever arms 49b, 49c extending at right angles from opposite ends of said base member. The links 50 connect the lever arms 49b to the blades 48 and the rods 51 are pivotally connected, as at 49d, to the other lever arms 49c. A grooved collar 52 is splined on the shaft 44 and radiating therefrom are slotted spider arms 53 in which the outer end portions of the rods 51 are slidably secured. A hand lever 54 is provided for shifting the collar 52 in a manner to adjust the blades 48 as desired.

Briefly, the operation of the apparatus is as follows:

Under operation of the hand lever 54 in opposite directions, respectively, the rods 51 are correspondingly moved endwise to swing the crank shafts 49 and adjust the blades 48 into different set positions to feather the same, the sliding connection of the rods 51 in the arms 53 providing for compensating movement of the rods 51 radially of the shaft 44 under swinging of the lever arms 49c on the legs of the spider 47.

It is believed that the many advantages of a seed cleaning apparatus and method in accordance with the present invention will be readily understood, and although a preferred embodiment is as illustrated and described, it is to be understood that changes may be resorted to which will fall within the scope of the invention as claimed.

What is claimed is:

For use in an air separator, a fan mechanism, including a rotary shaft, a pair of spiders fixed on the shaft in laterally spaced relation, each of said spiders comprising a plurality of radial arms, a plurality of fan blades mounted on said spiders in circumferentially spaced relation to the shaft and adjustable about axes parallel with that of the shaft, means to simultaneously adjust said blades during rotation of the shaft and into different set positions including a spider-like member shiftable along the shaft, a plurality of rods fixed to said member to extend laterally therefrom intermediate the blades, respectively, and slidably connected to one spider of said pair, operating connections between said rods and blades so constructed and arranged that endwise movement of the rods adjusts the blades, the connections between each blade and its corresponding part comprising a substantially U-shaped lever consisting of a base member lying along and journalled on one of the spider arms which support the fan blade, and two lever arms extending substantially at right angles from the ends of the base member, means connecting one of said lever arms to said rod, and a link connecting the other lever arm to said fan blade, and means for shifting the spider-like member including a lever operatively connected to the same.

LLOYD E. WRIGHT.
ROBERT I. WRIGHT.